United States Patent
Lee et al.

(10) Patent No.: US 12,212,599 B2
(45) Date of Patent: Jan. 28, 2025

(54) METHOD AND COMPUTER PROGRAM PRODUCT FOR HACKING DETECTION

(71) Applicant: Quanta Computer Inc., Taoyuan (TW)

(72) Inventors: Chen-Chung Lee, Taoyuan (TW);
Chia-Hung Lin, Taoyuan (TW);
Cheng-Yao Wang, Taoyuan (TW);
Li-Pin Tseng, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 435 days.

(21) Appl. No.: 17/321,266

(22) Filed: May 14, 2021

(65) Prior Publication Data
US 2022/0303309 A1 Sep. 22, 2022

(30) Foreign Application Priority Data
Mar. 22, 2021 (TW) .................................. 110110134

(51) Int. Cl.
*H04L 29/06* (2006.01)
*H04L 9/40* (2022.01)

(52) U.S. Cl.
CPC ...... *H04L 63/1491* (2013.01); *H04L 63/1416* (2013.01); *H04L 63/1425* (2013.01)

(58) Field of Classification Search
CPC ............. H04L 63/1416; H04L 63/1425; H04L 63/1491
See application file for complete search history.

(56) References Cited

U.S. PATENT DOCUMENTS

| | | | |
|---|---|---|---|
| 2004/0172557 A1* | 9/2004 | Nakae | H04L 63/20 726/22 |
| 2010/0082811 A1* | 4/2010 | Van Der Merwe | G06F 16/9535 709/225 |
| 2018/0367566 A1 | 12/2018 | Ma et al. | |
| 2022/0124069 A1* | 4/2022 | Chiu | H04L 63/0263 |

FOREIGN PATENT DOCUMENTS

| | | |
|---|---|---|
| CN | 103139184 A | 6/2013 |
| TW | 201738796 A | 11/2017 |

OTHER PUBLICATIONS

Chinese language office action dated Sep. 30, 2021, issued in application No. TW 110110134.
CN Office Action dated Oct. 30, 2024 in Chinese application No. 202110381685.9.

* cited by examiner

*Primary Examiner* — Jeffrey C Pwu
*Assistant Examiner* — Thong P Truong
(74) *Attorney, Agent, or Firm* — McClure, Qualey & Rodack, LLP

(57) ABSTRACT

The present invention discloses a hacking detection method, including: deploying a plurality of trap IP addresses in a trap IP address list; collecting access logs from a plurality of network devices to create a connection record list, wherein the connection record list includes a plurality of connection records; and comparing the trap IP address list and the connection record list to obtain a suspicious source list. The suspicious source list includes a plurality of suspicious source IP addresses. The suspicious source IP addresses match a portion of the trap IP addresses in the trap IP address list.

4 Claims, 7 Drawing Sheets

30

```
┌─────────────────────────────────────────┐
│ Segment a big subnet is into a plurality of │─301
│           small subnets                  │
└─────────────────────────────────────────┘
                    ↓
┌─────────────────────────────────────────┐
│ Select some of the small subnets to serve as │─302
│           to-be-used subnets             │
└─────────────────────────────────────────┘
                    ↓
┌─────────────────────────────────────────┐
│ Deploy all the IP addresses in the unselected │─303
│    small subnets to be trap IP addresses │
└─────────────────────────────────────────┘
```

FIG. 3

METHOD AND COMPUTER PROGRAM PRODUCT FOR HACKING DETECTION

CROSS REFERENCE TO RELATED APPLICATIONS

This Application claims priority of Taiwan Patent Application No. 110110134, filed on Mar. 22, 2021, the entirety of which is incorporated by reference herein.

BACKGROUND OF THE INVENTION

Field of the Invention

The present disclosure is related to a method and computer program product for information security, and particularly to a method and computer program product for hacking detection.

Description of the Related Art

In the past, hacking has often been used widely to illicitly collect information about network devices, directly causing damage to the system or the environment. However, new types of hacking use low-frequency scanning means, which steals user data by disguising itself as normal behavior instead of attacking the system or the environment directly, so as to avoid being detected by antivirus software. Hackers may draw up a strategy for accurate phishing or fraud based on the information stolen.

Conventional antivirus software often uses techniques such as feature extraction and behavior database comparison to ensure the protection of information security. The wide scanning and real-time sabotage employed by conventional hacking techniques may often be recognized and stopped by such conventional antivirus software. However, since the behavior of the new type of hacking is similar to normal access behavior, and so its features are not obvious. As such, the protective effect of the conventional antivirus software against the new type of hacking described above is not satisfactory.

Hence, there is a need for a method that is able to detect the low-frequency scanning behavior of hacking spy programs so as to supplement the defects of conventional antivirus software.

BRIEF SUMMARY OF THE INVENTION

An embodiment of the present disclosure provides a method for hacking detection, including: deploying a plurality of trap IP addresses in a trap IP address list; collecting access logs from a plurality of network devices to create a connection record list, wherein the connection record list includes a plurality of connection records; and comparing the trap IP address list and the connection record list to obtain a suspicious source list, wherein the suspicious source list includes a plurality of suspicious source IP addresses, the suspicious source IP addresses match a portion of the trap IP addresses in the trap IP address list.

In some embodiments, the method further includes: performing an exception exclusion operation on the suspicious source list based on a white list, so that all of the suspicious source IP addresses in the suspicious source list are not in the white list; and checking whether the behaviors corresponding to the suspicious source IP addresses in the suspicious source list are abnormal, adding the suspicious IP addresses that were confirmed to have abnormal behaviors into a hostile source list, and adding the suspicious IP addresses that were determined to have no abnormal behaviors into the white list.

In some embodiments, deploying the trap IP addresses in the trap IP address list includes: segmenting a big subnet into a plurality of small subnets; selecting some of the small subnets to be to-be-used subnets; and deploying all the IP addresses in the unselected small subnets to be trap IP addresses.

In some embodiments, deploying the trap IP addresses in the trap IP address list includes: reserving a specific proportion of IP addresses in a user subnet to be trap IP addresses; and deploying all the IP addresses in the user subnet that are not yet allocated to user devices to be trap IP addresses.

In some embodiments, deploying the trap IP addresses in the trap IP address list includes: creating a plurality of islanding IP groups, wherein each islanding IP group corresponds to a specific system service type; and deploying the trap IP addresses in each of the islanding IP groups inconsecutively.

An embodiment of the present disclosure provides a computer program product for hacking detection, the program is loaded by the computer to execute: a first program instruction, serving as a trap deployment module, used for deploying a plurality of trap IP addresses in a trap IP address list; a second program instruction, serving as a connection record module, used for collecting access logs from a plurality of network devices to create a connection record list, wherein the connection record list comprises a plurality of connection records; a third program instruction, performing a comparison module, used for comparing the trap IP address list and the connection record list to obtain a suspicious source list, wherein the suspicious source list includes a plurality of suspicious source IP addresses, the suspicious source IP addresses match a portion of the trap IP addresses in the trap IP address list.

In some embodiments, the program is loaded by the computer to further execute: a fourth program instruction, serving as a verification module, used for checking whether the behaviors corresponding to the suspicious source IP addresses in the suspicious source list are abnormal, adding the suspicious IP addresses that were confirmed to have abnormal behaviors into a hostile source list, and adding the suspicious IP addresses that were determined to have no abnormal behaviors into a white list.

In some embodiments, the comparison module is further used for performing an exception exclusion operation on the suspicious source list based on the white list, so that all of the suspicious source IP addresses in the suspicious source list are not in the white list.

BRIEF DESCRIPTION OF THE DRAWINGS

The patent or application file contains a least one drawing executed in color. Copies of this patent or patent application publication with color drawing(s) will be provided by the Office upon request and payment of the necessary fee. The present disclosure can be more fully understood by reading the subsequent detailed description and examples with references made to the accompanying drawings, wherein:

FIG. 3 is a flow diagram of a method 30 for trap IP deployment executed in operation 101 of the method 10 or the method 20, according to an embodiment of the present disclosure.

DETAILED DESCRIPTION OF THE INVENTION

When invading the system and the environment, new types of hackers or viruses may perform low-frequency scanning within the same subnet or cross subnets inconspicuously. Targeting features of such new types of hacking, this disclosure provides a detection mechanism for drawing up a suspicious source IP list. In general, this mechanism is to deploy some trap IP addresses that are unknown to hackers or viruses, and make normal access behaviors not to access these trap IP addresses. Thus, sources accessing these trap IP addresses are probably hostile.

Figure 1:
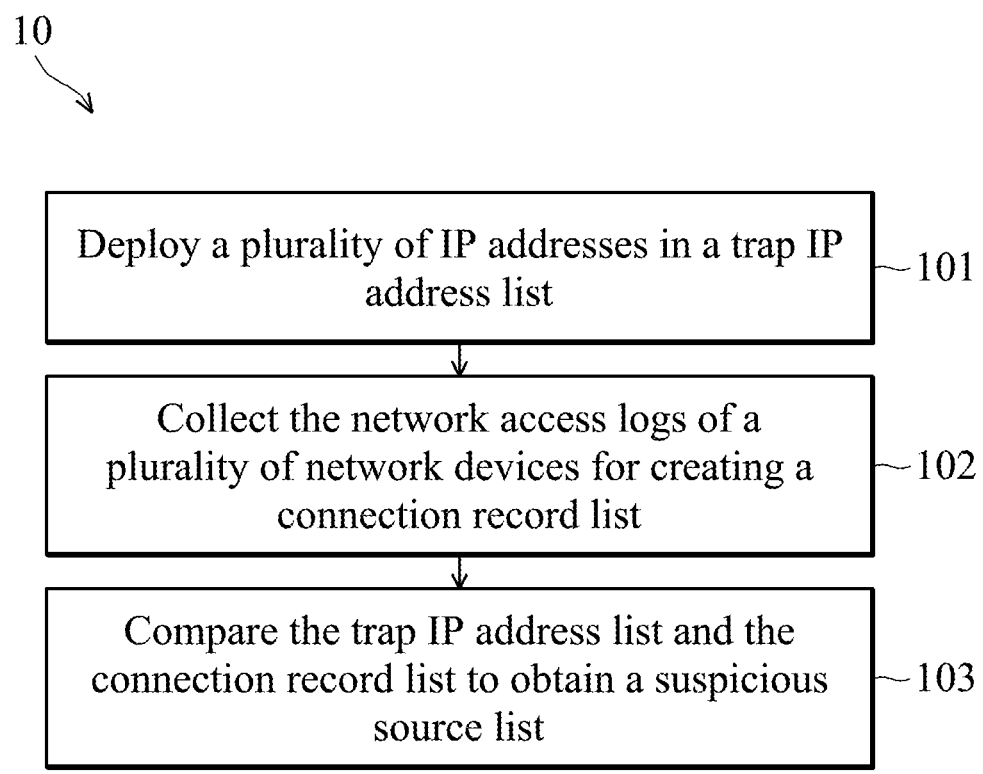
FIG. 1 is a flow diagram of a method 10 for hacking detection, according to an embodiment of the present disclosure.

FIG. 1 is a flow diagram of a method 10 for hacking detection, according to an embodiment of the present disclosure. As shown in FIG. 1, method 10 includes operation 101, operation 102 and operation 103.

The method 10 starts from operation 101. In operation 101, a plurality of IP addresses in a trap IP address list are deployed. Then, the method 10 proceeds to operation 102.

In operation 102, the network access logs of a plurality of network devices are collected for creating a connection record list. The connection record list includes a plurality of connection records, and each of the connection records at least records the IP address of the network device that was accessed (i.e., the target site IP address). Then, the method 10 proceeds to operation 103.

In operation 103, the trap IP address list and the connection record list are compared to obtain a suspicious source list. The suspicious source list includes a plurality of suspicious source IP addresses that match a portion of the trap IP addresses in the trap IP addresses list.

In other words, operation 103 is to check one-by-one whether the target site IP addresses recorded by each connection record in the connection record exist in the trap IP address list or not, and to add the source IP addresses that fall into the traps to the suspicious source list. Thus, system administrators, network administrators, or information security engineers do not need to search in the environment like looking for a needle in a haystack. Instead, they just need to monitor and check the sources in the suspicious source list, so as to find the hostile sources and block them.

In the preferred embodiments, in view of some behaviors that are not hostile, such as the scanning behavior of an antivirus software and the broadcasting behavior of a network protocol, may also access the trap IP addresses and thus be added into the suspicious source list, the method disclosed herein for hacking detection may further include a mechanism of black list and white list, in order to identify the hostile sources more accurately.

Figure 2:
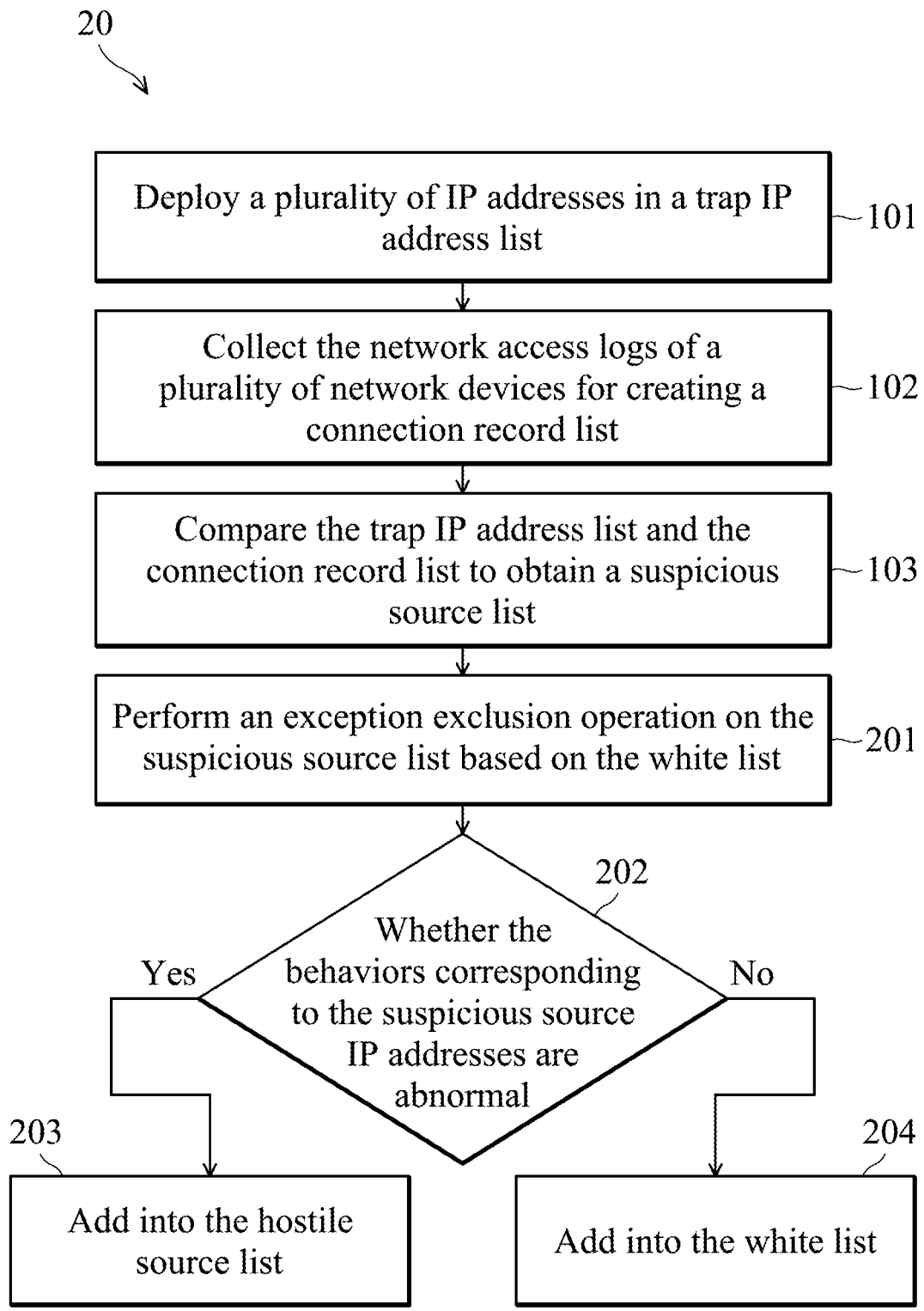
FIG. 2 is a flow diagram of a method 20 for hacking detection, according to a preferred embodiment.

FIG. 2 is a flow diagram of a method 20 for hacking detection, according to a preferred embodiment. As shown in FIG. 2, compared to the method 10 in FIG. 1, the method 20 further includes operation 201-204.

After the suspicious source list is obtained in operation 103, at the subsequent operation 201, an exception exclusion operation is performed on the suspicious source list based on the white list, so that all of the suspicious source IP addresses in the suspicious source list are not in the white list. Then, the method 20 proceeds to operation 202.

In other words, operation 201 is to exclude the suspicious source IP addresses existing in the white list from the suspicious source list, so as to exclude the access behaviors that are mistakenly regarded as suspicious sources.

In operation 202, whether the behaviors corresponding to the suspicious source IP addresses in the suspicious source list are abnormal are checked one by one. The method 20 then performs operation 203 on the suspicious source IP addresses that were confirmed to have abnormal behaviors. That is, the suspicious IP addresses that were confirmed to have abnormal behaviors are added into a hostile source list. On the other hand, the method 20 performs operation 204 on the suspicious source IP addresses that were confirmed to have no abnormal behaviors. That is, the suspicious IP addresses that were confirmed to have no abnormal behaviors are added into a white list. When the method 20 is performed the next time, the white list may be provided as the basis for the exception exclusion operation in operation 201.

In some embodiments, in operation 103, the comparison between the trap IP address list and the connection record list may only for the connection records from access occurred in a specific period. Not all the connection records accumulated in the past must be compared. For this purpose, each of the connection records in the connection record list created in operation 102 may include an access time (e.g., "2020/08/03 23:40:59" or "2020/08/04 22:10:38") and the source IP address, and each of the suspicious source IP addresses in the suspicious source list obtained in operation 103 may correspond to an access period (e.g., "2020/08/04" or "2020/08/03-2020/08/05") and an access count.

The access period is actually the range of the connection records being compared in operation 103. The access period may be set depending on actual demands. For example, only the connection records on the day "2020/08/04" are compared, or only the connection records in the three-day period "2020/08/03-2020/08/05" are compared. The access count is the number of connection records in which the source IP address matches the suspicious IP addresses (i.e., the source IP address exists in the trap IP address list) and the access time matches the designated access period. For example, if the suspicious source IP address is "10.241.136.72" and the access period is set to be "2020/08/04", then the access count is the number of connection records from the source IP address "10.241.136.72" and during the day "2020/08/04".

In further embodiments, the method disclosed herein for hacking detection may further include sorting the suspicious source IP addresses in the suspicious source list according to the access count, so as to find the sources accessing the trap IP addresses the most times during the designated access period, and thereby determine the priority of the sources to be handled.

FIG. 3 is a flow diagram of a method 30 for trap IP deployment executed in operation 101 of the method 10 or the method 20, according to an embodiment of the present disclosure. As shown in FIG. 3, the method 30 includes operation 301, operation 302, and operation 303.

In operation 301, a big subnet is segmented into a plurality of small subnets. For example, the big subnets "10.1~10.255" are segmented into small subnets such as "10.5~10.15", "10.16~10.25", "10.26~10.95", "10.96~10.99", "10.100~10.255", and "10.226~10.244".

In operation 302, some of the small subnets are selected to serve as to-be-used subnets. For example, "10.16~10.25", "10.96~10.99" and "10.226~10.244" are selected to serve as to-be-used subnets. The method 30 then proceeds to operation 303.

In operation 303, all the IP addresses in the unselected small subnets are deployed to be trap IP addresses. For example, all the IP addresses in the unselected subnets "10.5~10.15", "10.26~10.95" and "10.100~10.255" are deployed to be trap IP addresses.

The method 30 can limit the coverage of hacking by restricting the functions for the subnets not planned to be used and using IP by segments. It is especially suitable for capturing the hostile sources that attack for the first time.

Figure 4:
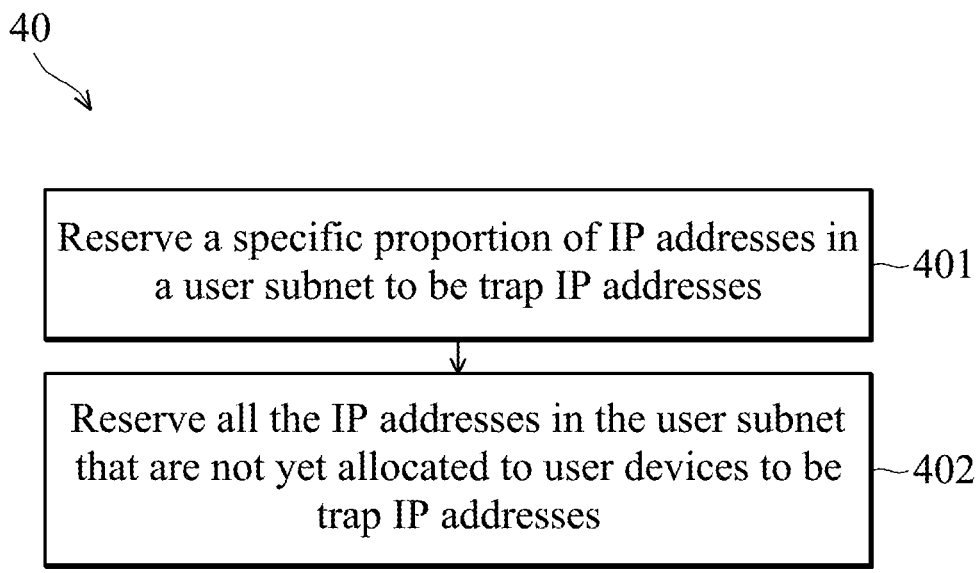
FIG. 4 is a flow diagram of a method 40 for trap IP deployment executed in operation 101 of the method 10 or the method 20, according to an embodiment of the present disclosure.

FIG. 4 is a flow diagram of a method 40 for trap IP deployment executed in operation 101 of the method 10 or the method 20, according to an embodiment of the present disclosure. As shown in FIG. 4, the method 40 includes operation 401 and operation 402.

In operation 401, a specific proportion of IP addresses in a user subnet are reserved to be trap IP addresses. For example, 10% of the IP addresses in a user subnet are reserved to be trap IP addresses. The method 40 then proceeds to operation 402.

In operation 402, all the IP addresses in the user subnet that are not yet allocated to user devices are deployed to be trap IP addresses. For example, if 70% of the IP addresses in the user subnet have been allocated to user devices, then the remaining 30% of IP addresses are deployed to be trap IP addresses. If 80% of the IP addresses in the user subnet have been allocated to user devices, then the remaining 20% of IP addresses are deployed to be trap IP addresses. Since 10% of the IP addresses have been reserved to be trap IP addresses in operation 401, the IP addresses in the user subnet that are allocated to user device cannot exceed 90%.

In Information Technology environments, the devices in the user subnets are usually for the communication with other devices within the same user subnet. And, the low-frequency scanning behavior of the new type of hacking usually targets neighboring IP addresses to encroach first. Hence, the method 40 is especially suitable for capturing the low-frequency behaviors in the local area network (LAN).

Figure 5:
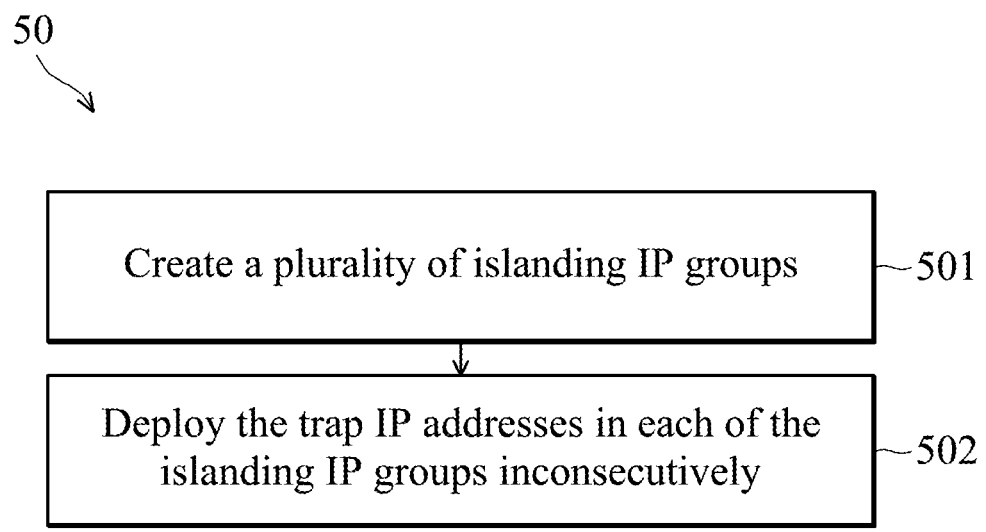
FIG. 5 is a flow diagram of a method 50 for trap IP deployment executed by operation 101 of the method 10 or the method 20, according to an embodiment of the present disclosure.

FIG. 5 is a flow diagram of a method 50 for trap IP deployment executed by operation 101 of the method 10 or the method 20, according to an embodiment of the present disclosure. As shown in FIG. 5, the method 50 includes operation 501 and operation 502.

In operation 501, a plurality of islanding IP groups are created. Each islanding IP group corresponds to a specific system service type. The islanding deployment may gather the system services with the same service type in the same IP group. For example, the islanding IP groups such as "10.243.17.30~10.243.17.50", "10.243.17.100~10.243.17.120" and "10.243.17.150~10.243.17.160" are corresponding to the file services, the web services and the mail services respectively. The method 50 then proceeds to operation 502.

In operation 502, the trap IP addresses in each of the islanding IP groups are inconsecutively deployed. For example, the inconsecutive IP addresses "10.243.17.151", "10.243.17.153", "10.243.17.155" and "10.243.17.157" in the islanding IP groups "10.243.17.150~10.243.17.160" are deployed to be trap IP addresses.

Through the method 50, the services provided by the IP addresses in each islanding IP group are recognizable, so the accessed service types may be the basis for determining whether the access behaviors are abnormal. In addition, the inconsecutive IP deployment may prevent low-frequency neighboring encroachment and infiltration of the hostile programs. The method 50 is especially suitable for increasing the capture rate of hostile behaviors for a system (such as a mail system) that is often a target to be attacked.

Figure 6A:
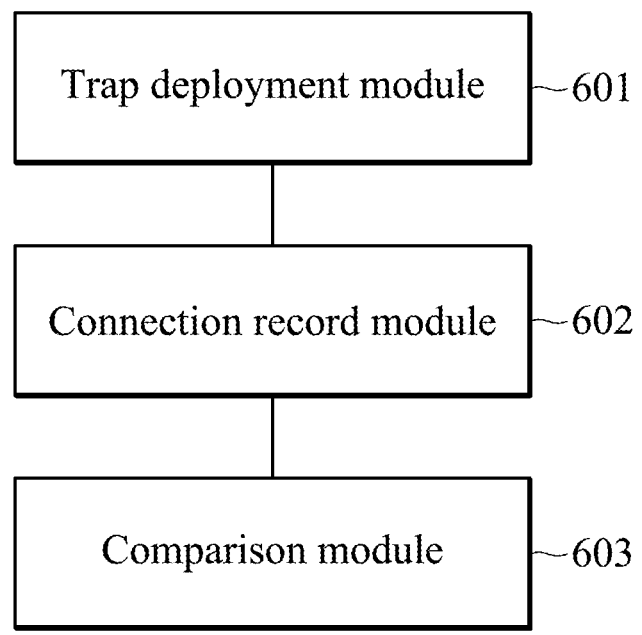
FIG. 6A illustrates the schematic block diagram of functions of program instructions executed by a computer program product loading the program, according to an embodiment of the present disclosure.

FIG. 6A illustrates the schematic block diagram of functions of program instructions executed by a computer loading the program, according to an embodiment of the present disclosure. The computer program product is installed on a computer, and the program instructions (or codes) of the computer program product are loaded and executed by the computer to detect hacking. As shown in FIG. 6A, after the computer program codes are loaded into the computer, the first program instruction, the second program instruction and the third program instruction are executed for performing functions corresponding to the trap deployment module 601, the connection record module 602 and the comparison module 603 respectively.

In this embodiment, the trap deployment module 601, the connection record module 602 and the comparison module 603 are used for performing operation 101, operation 102 and operation 103 of the method 10 respectively.

Figure 6B:
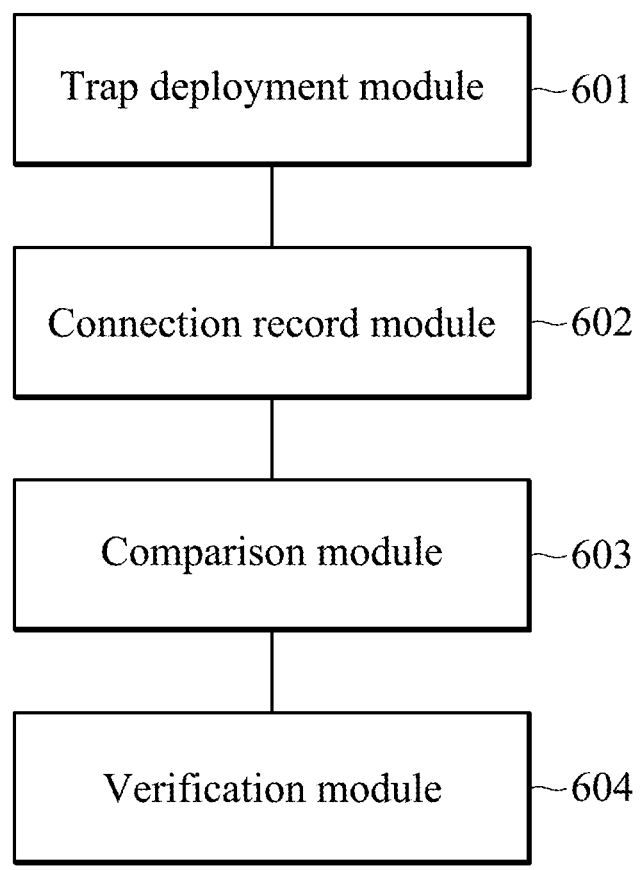
FIG. 6B illustrates the schematic block diagram of functions of program instructions executed by a computer program product loading the program, according to a preferred embodiment of the present disclosure.

In preferred embodiments, the computer program product provided by the present disclosure may further include the mechanism of black list and white list, in order to identify the hostile sources more accurately. FIG. 6B illustrates the schematic block diagram of functions of program instructions executed by a computer program product loading the program, according to a preferred embodiment of the present disclosure. Compared to the embodiment illustrated by FIG. 6A, in the preferred embodiment illustrated by FIG. 6B, after the program is load by the computer, the fourth program instruction is further executed and performed as the verification module 604.

In this preferred embodiment, the trap deployment module 601 is used for performing operation 101 of the method 20. The connection record module 602 is used for performing operation 102 of the method 20. The comparison module 603 is for performing operation 103 and operation 201 of the method 20. The verification module 604 is used for performing operation 202, operation 203 and operation 204 of the method 20.

The method and computer program product provided by the embodiments of the present disclosure for hacking detection may supplement the defect of conventional anti-virus software, and enable system administrators, network administrators, or information security engineers to handle the new types of hacking quickly and efficiently.

Ordinal terms used in the claims, such as "first," "second," "third," etc., are used to modify the elements appearing in the claims, and do not imply any prioritization, precedence relation, or a component is higher than the other component, or the chronological order in which the method steps are performed. The intention is to make a distinction between elements with the same name.

"Some embodiments", "one embodiment", "embodiment", "multiple embodiments", "this Embodiment", "these Embodiments", "one or more embodiments", "some of the embodiments" and "one of the embodiments" mean one or more embodiments, but not all, unless otherwise specifically defined.

The above paragraphs are described with multiple aspects. Obviously, the teachings of the specification may be performed in multiple ways. Any specific structure or function disclosed in examples is only a representative situation. According to the teachings of the specification, it should be noted by those skilled in the art that any aspect disclosed may be performed individually, or that more than two aspects could be combined and performed.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for hacking detection, comprising:
   deploying a plurality of trap IP addresses in a trap IP address list;
   collecting access logs from a plurality of network devices to create a connection record list, wherein the connection record list comprises a plurality of connection records; and
   comparing the trap IP address list and the connection record list to obtain a suspicious source list, wherein the suspicious source list includes a plurality of suspicious source IP addresses, the suspicious source IP addresses match a portion of the trap IP addresses in the trap IP address list; and
   performing an exception exclusion operation on the suspicious source list based on a white list, so that all of the suspicious source IP addresses in the suspicious source list are not in the white list;
   wherein deploying the trap IP addresses in the trap IP address list comprises:
   creating a plurality of islanding IP groups, wherein each islanding IP group corresponds to a specific system service type; and
   deploying the trap IP addresses in each of the islanding IP groups inconsecutively.

2. The method as claimed in claim 1, further comprising:
   checking whether behaviors corresponding to the suspicious source IP addresses in the suspicious source list are abnormal, adding the suspicious IP addresses that were confirmed to have abnormal behaviors into a hostile source list, and adding the suspicious IP addresses that were determined to have no abnormal behaviors into the white list.

3. A computer program product for hacking detection, wherein the program is loaded by the computer to execute:
   a first program instruction, serving as a trap deployment module, used for deploying a plurality of trap IP addresses in a trap IP address list;
   a second program instruction, serving as a connection record module, used for collecting access logs from a plurality of network devices to create a connection record list, wherein the connection record list comprises a plurality of connection records; and
   a third program instruction, performing a comparison module, used for comparing the trap IP address list and the connection record list to obtain a suspicious source list, wherein the suspicious source list includes a plurality of suspicious source IP addresses, and the suspicious source IP addresses match a portion of the trap IP addresses in the trap IP address list;
   wherein the comparison module is further used for performing an exception exclusion operation on the suspicious source list based on the white list, so that all of the suspicious source IP addresses in the suspicious source list are not in the white list;
   wherein deploying the trap IP addresses in the trap IP address list comprises:
   creating a plurality of islanding IP groups, wherein each islanding IP group corresponds to a specific system service type; and
   deploying the trap IP addresses in each of the islanding IP groups inconsecutively.

4. The computer program product as claimed in claim 3, wherein the program is loaded by the computer to further execute:
   a fourth program instruction, serving as a verification module, used for checking whether the behaviors corresponding to the suspicious source IP addresses in the suspicious source list are abnormal, adding the suspicious IP addresses that were confirmed to have abnormal behaviors into a hostile source list, and adding the suspicious IP addresses that were determined to have no abnormal behaviors into a white list.

* * * * *